United States Patent [19]

Seiberlich

[11] Patent Number: 5,018,913
[45] Date of Patent: May 28, 1991

[54] DEVICE FOR CONTROLLING THE TOOL POSITION DEPENDING ON THE STROKE POSITION

[75] Inventor: Walter Seiberlich, Ettlingen, Fed. Rep. of Germany

[73] Assignee: Maag-Gear-Wheel & Machine Co. Ltd., Zurich, Switzerland

[21] Appl. No.: 313,076

[22] Filed: Feb. 21, 1989

[30] Foreign Application Priority Data

Mar. 8, 1988 [CH] Switzerland .................... 00857/88-1

[51] Int. Cl.⁵ .......................... B23F 5/16; B23D 1/00
[52] U.S. Cl. ...................................... 409/34; 409/60; 409/334
[58] Field of Search ................... 409/31, 33, 34, 37, 409/42, 49, 58, 60, 304, 317, 326, 330, 331, 334, 348, 347

[56] References Cited

U.S. PATENT DOCUMENTS

| 1,118,342 | 11/1914 | Hanson | 409/334 |
| 1,587,815 | 6/1926 | Boas | 409/334 |
| 1,775,963 | 9/1930 | McCarroll | 409/326 |
| 2,125,873 | 8/1938 | Aeberli | 409/34 |
| 2,129,858 | 9/1938 | Miller | 409/34 |
| 3,783,740 | 1/1974 | Seiberlich | 409/34 |

FOREIGN PATENT DOCUMENTS

| 2148801 | 8/1974 | Fed. Rep. of Germany . | |
| 115112 | 7/1984 | Japan | 409/304 |
| 1166924 | 7/1985 | U.S.S.R. | 409/34 |
| 542741 | 1/1942 | United Kingdom | 409/34 |

Primary Examiner—Z. R. Bilinsky
Attorney, Agent, or Firm—R. A. Giangiorgi

[57] ABSTRACT

In order to obtain a desired course of a machining line differing from a straight line or a corresponding flank line of a workpiece profile, it is necessary to control the working point of the tool 2 so that on the rectilinear stroke movement of the tool 2, a movement extending transversely thereto is effected by a tool positioning device 4. Such a device is constructed in the form of a toggle mechanism on which further fine control movements can be imposed through a series of adjustment possibilities.

36 Claims, 6 Drawing Sheets

DEVICE FOR CONTROLLING THE TOOL POSITION DEPENDING ON THE STROKE POSITION

This invention relates to a device for controlling the tool position depending on the stroke position with a reciprocating tool movement.

Hitherto, the control of the tool position was carried out, inter alia, with a lifting device for the gear shaper cutter in accordance with DE 21 48 801, with a rotary cam drive acting at right angles to the stroke direction, against a spring force, in two selectively opposed lifting directions and adjustable with regard to the phase position of the reciprocating drive, wherein a single lifting cam is mounted on an eccentric shaft rotatable and locatable in the machine frame and, according to its adjustment, acts directly on one of two opposite surfaces formed on the shaper-cutter spindle support, and that in order to exert the spring force, compression springs which are situated opposite one another in pairs and are operatively associated with the counter surfaces of the lifting cam are disposed on the shaper-cutter spindle support in such a manner that one of the springs at a time bears against a support which is adjustable on the machine frame.

It is a disadvantage of this lifting device, that the magnitude of the amount of lift cannot be varied without changing the lifting cam. This is particularly important because a smaller amount of lift is necessary for finish-machining than for rough-machining.

In addition, a correction of the values for the production of taper and/or crowning for the teeth to be produced is necessary as a result of the tocl dressing. In the known machines, this correction is, on the one hand, only possible within narrow limits and on the other hand is very complicated and cannot be carried out for all teeth.

In addition, it is a disadvantage that the direct fixing of the position of the tool head during the working stroke by bearing against the cam causes great "point" loadings and hence wear in a small region of the lifting cam. Therefore, with a direct offtake of movement, the lifting cam has to be replaced more frequently which leads, on the one hand to stoppage times of the machine and loss of production which, in some circumstances, in a production line may stop this itself, and on the other hand to making replacements available and to maintenance activity as well as to a fluctuating quality of manufacture.

In addition to this, corrections to the geometrical shape of the tooth flank can only be made to a very limited extent with the known lifting device.

It is therefore an object of the invention to provide a device which renders possible a very rigid control of the tool along a machining path which can be preset and which is also adapted for the production of tooth-flank corrections, while very narrow manufacturing tolerances can be adhered to, that is to say a very high quality of product can be achieved.

Furthermore, the effect is to be achieved that the intervals between stoppages of the machine as a result of wear phenomena at the lifting device are lengthened considerably.

This object can be achieved, in accordance with the invention.

Further details and advantage can be seen from the description of examples of embodiment of the invention with reference to the drawing. In this FIG. 1 shows parts of a first form of embodiment, in side view, as a diagrammatic illustration with a 1st form of adjustment device;

Figure 1:
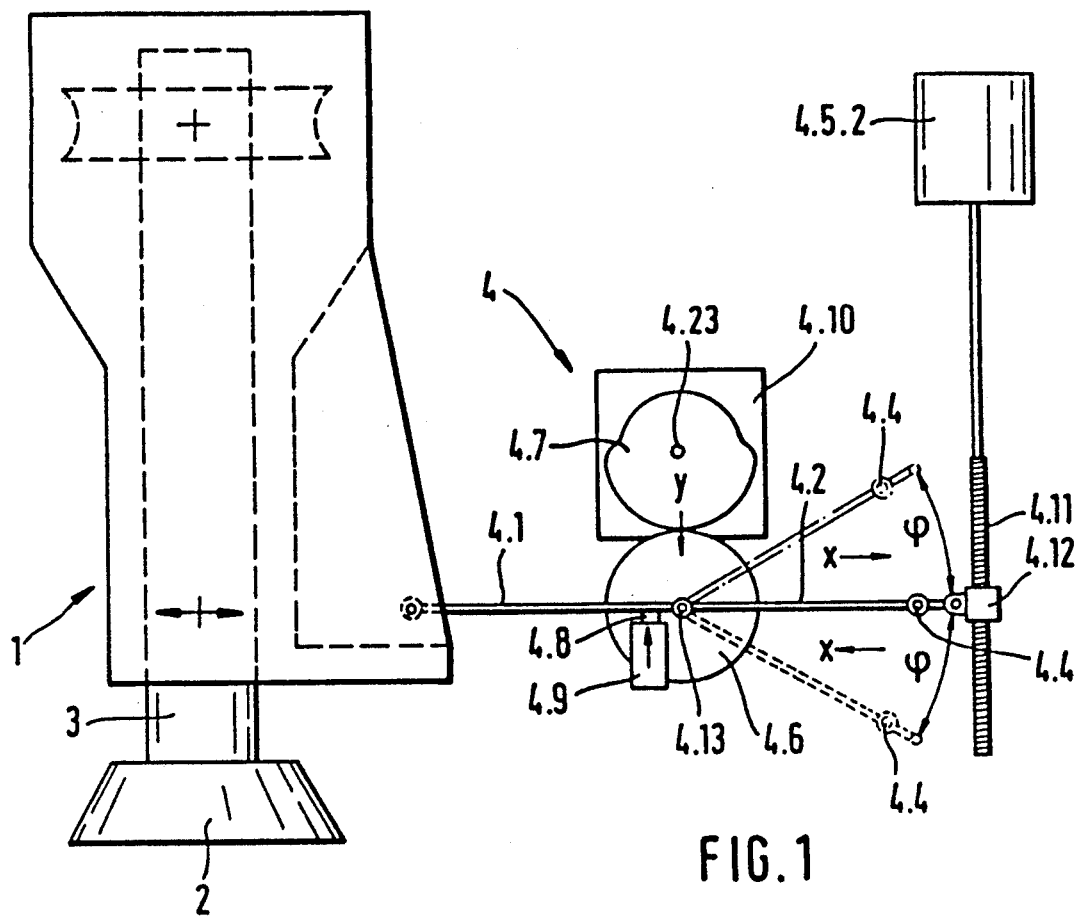

On a machine tool, for example a slotting or shaping machine, a tool head 1 having a tool 2 mounted on a tool spindle 3, is disposed above a work table (not illustrated) for the workpiece (not illustrated) and is supported on the machine frame for pivoting relative to this. A tool positioning device 4, which essentially controls the dynamic positioning of the cutting edge during the working stroke and the idle stroke, is provided to determine the pivotal position of the tool head 1. In accordance with one form of the invention, the tool positioning device 4 acts on the tool head 1 and on a component of the machine frame and is operative depending upon the infeed movement for the suppression of play in substantially the normal direction to the tool head 1.

A first variant (FIGS. 1, 2, 3, 11) of this tool positioning device 4 comprises a control mechanism which is constructed in the form of a toggle mechanism 4.1, 4.2 and which contains a first toggle layer 4.1 articulated on the tool head 1 and on which there is articulated a second toggle lever 4.2 which in turn is connected to an adjustment device 4.3.1 comprising a control motor 4.5.1 and serving for the lockable displacement of the toggle-mechanism pin 4.4, fixed to the mechanism, for the selection of the lifting direction and/or the extent of lift.

The extent of lift is determined by the value of the angle of deflection $\psi$ and the lifting direction is determined by the sign thereof. If the toggle-mechanism pin 4.4, fixed to the mechanism is lying—with reference to FIG. 1 or 11—on the second toggle lever 4.2 below the horizontal plane of symmetry, this results in a first lifting direction and if this toggle-mechanism pin 4.4 lies on the second toggle lever 4.2 above the horizontal plane of symmetry, this results in a second lifting direction with the same cam 4.7.

The first form of the common shaft 4.13, of the two toggle levers 4.1 and 4.2, is constructed in the form of a straight shaft. Mounted on the shaft is a free-running lifting roller 4.6 which bears continuously against a cam 4.7. For this purpose, a pressure-applying device 4.8 is provided which comprises an adjustable, mechanically, hydraulically or pneumatically acting elastic spring element (not illustrated) which acts on the first toggle lever 4.1 via a ram 4.9. The cam 4.7 is mounted on a camshaft 4.23 which is connected to a drive device 4.10, for example a motor or the like.

The adjustment device 4.3.1 comprises a control motor (4.5.2) which, in a first form of embodiment, is connected to a screw spindle 4.11, the nut 4.12 of which acts on the second toggle lever 4.2. In a second form of embodiment of the adjustment device 4.3.1, this is constructed in the form of a pivotable crankshaft which is mounted on the slotting or shaping machine and the crankpin of which carries the second toggle lever 4.2 with a bearing, and the shaft portion of which is mounted coaxially to the lifting roller 4.6, at the side of this, and is connected to the control motor 4.5.1.

Figure 2:
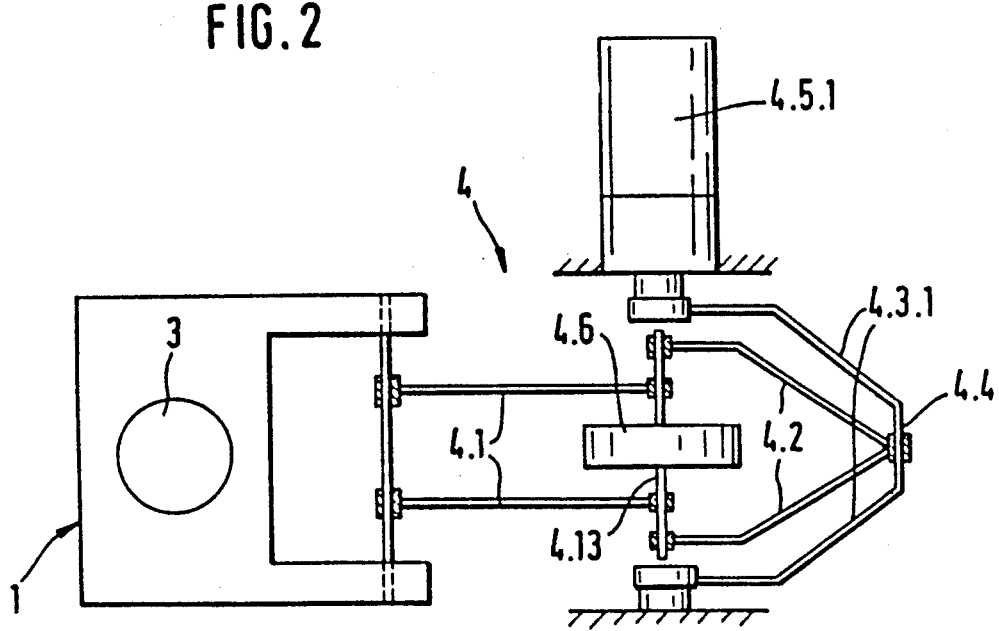
FIG. 2 shows parts of a first form of embodiment in view from above, as a diagrammatic illustration, with a 2nd form of adjustment device.
Figure 3:
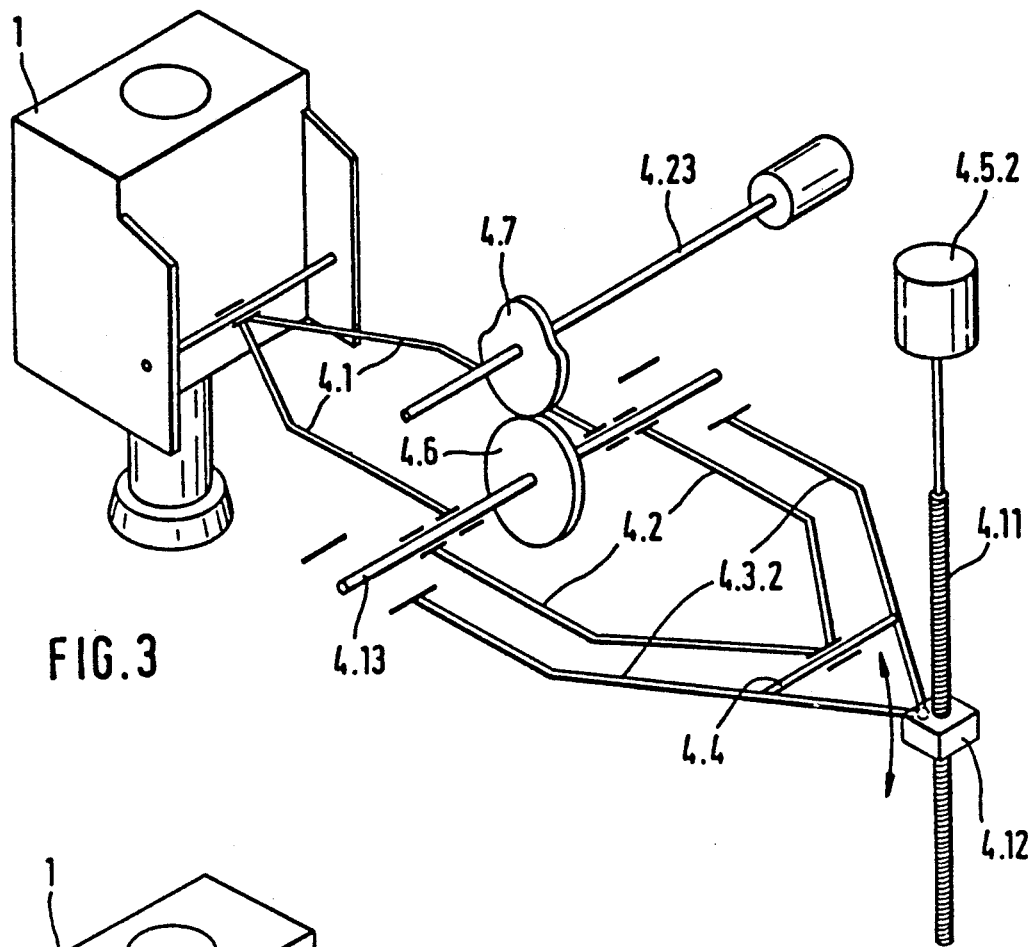
FIG. 3 shows parts of a first form of embodiment in a diagrammatic three-dimensional illustration.
Figure 11:
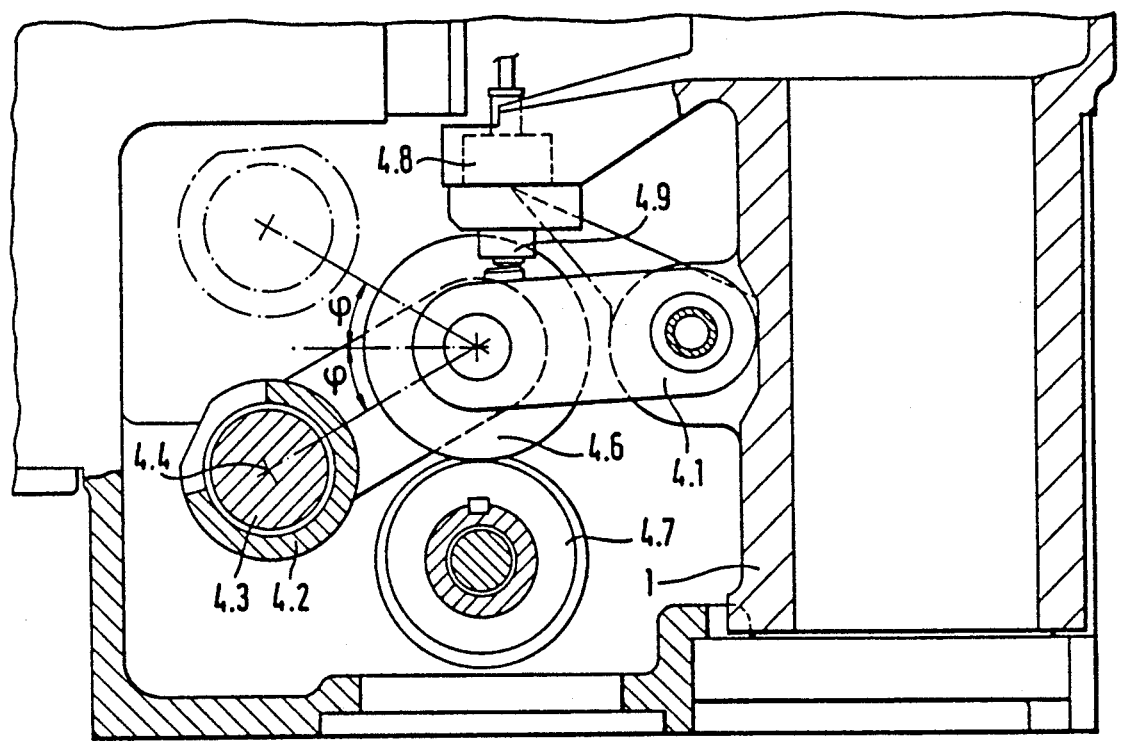
FIG. 11 shows details of the embodiment of FIGS. 1, 2 and 3 in section.

The mode of operation of the first variant of the device for controlling the tool position depending on the stroke position at the machine tool is as follows in connection with FIGS. 1, 2, 11. The lifting or control movement of the tool head 1 is effected depending on the stroke position of the tool 2 via electrical means or mechanical gear trains (not illustrated and known per se) which couple the reciprocating drive and the tool positioning device 4. For a specific basic amount of lift and lifting direction, the second toggle lever 4.2 is brought with its toggle-mechanism pin 4.4 fixed to the mechanism into a preselected position (above or below the positional plane of symmetry which, in FIGS. 1 and 11, has the trace extending parallel to the edge of the page) and locked. A selected cam 4.7 is mounted on the camshaft. After the usual setting-up work when beginning work on a workpiece, the cam 4.7 is turned depending on the stroke movement of the tool head 1 and according to the shape of the curve provided thereon, the common shaft 4.13 of the two toggle levers 4.1 and 4.2 is correspondingly moved via the lifting roller 4.6 and this movement is transmitted to the tool head 1. According to the shape of the curve of the cam 4.7, the course of the movement is effected along the length of the stroke, that is to say the lifting or machining line is determined, as a result of which for example the crowning of a profile or any other predetermined course of a profile can be achieved along the length of the stroke. If the basic lifting amount is adjusted in extent and direction by the adjustment device 4.3.1 and its control motor 4.5.1, that is to say the angle $\psi$ is altered, another position of the lifting or machining line results at the tool head 1. Its course, however, depends on the shape of the curve of the cam 4.7.

A second variant of a tool positioning device 4 (FIG. 4) comprises a control mechanism which is constructed in the form of a toggle mechanism 4.1,4.2 and which contains a first toggle lever 4.1 articulated on the tool head 1 and on which a second toggle lever 4.2 is articulated which in turn is connected to an adjustment device 4.3.2, comprising a control motor 4.5.2 and serving for the lockable displacement of the toggle-mechanism pin 4.4 for the selection of the lifting direction and/or extent of lift.

In this case, the extent of lift is determined by the value of the angle of deflection $\psi$ and the lifting direction by the sign thereof. If the toggle-mechanism pin 4.4 fixed to the mechanism lies on the second toggle lever 4.2—with reference to FIG. 1 or 11—below the horizontal plane of symmetry, this results in a first lifting direction, and if this toggle-mechanism pin 4.4 lies on the second toggle lever 4.2 above the horizontal plane of symmetry this results in a second lifting direction with the same cam 4.7.

The second form of common shaft 4.14 of the two toggle levers 4.1 and 4.2 is constructed in the manner of a crankshaft which, on its crankpin 4.17, carries a lifting roller 4.6 which cooperates with a cam 4.7 which can be driven. In addition, a pressure-applying device 4.8 (not illustrated in FIG. 4) is provided as in the first variant of the tool positioning device 4 and holds the lifting roller 4.6 and the cam 4.7 in constant contact with one another.

Instead of a crankshaft 4.14, a lifting-roller eccentric (not illustrated) may also be provided on which the lifting roller 4.6 is mounted for rotation. This lifting-roller eccentric may in turn be adjustable, in particular adjustable in a manner which can be controlled or regulated.

The lifting roller 4.6 can be controllably adjusted by means of the eccentricity of the crank or eccentric as a result of which an effect equivalent to a variation of the control curve on the cam 4.7, namely altering the course of the flank line, is achieved with the advantage that the cam 4.7 does not have to be dismounted and another one installed. Moreover, this change is possible while the machine tool is in operation. In addition, the first toggle lever 4.1 is mounted, by one of its ends, on an adjustable crank 4.18. As a result, it is possible to influence the course of the flank line additionally without having to change any parts such as the cam 4.7 etc. By means of a motor-driven (not illustrated) and controllable or manual adjustment, the particular position of the tool head 1 and hence of the working range of the tool in relation to the workpiece can be influenced for each working and return setting, in addition to the lever and cam adjustment.

Figure 4:
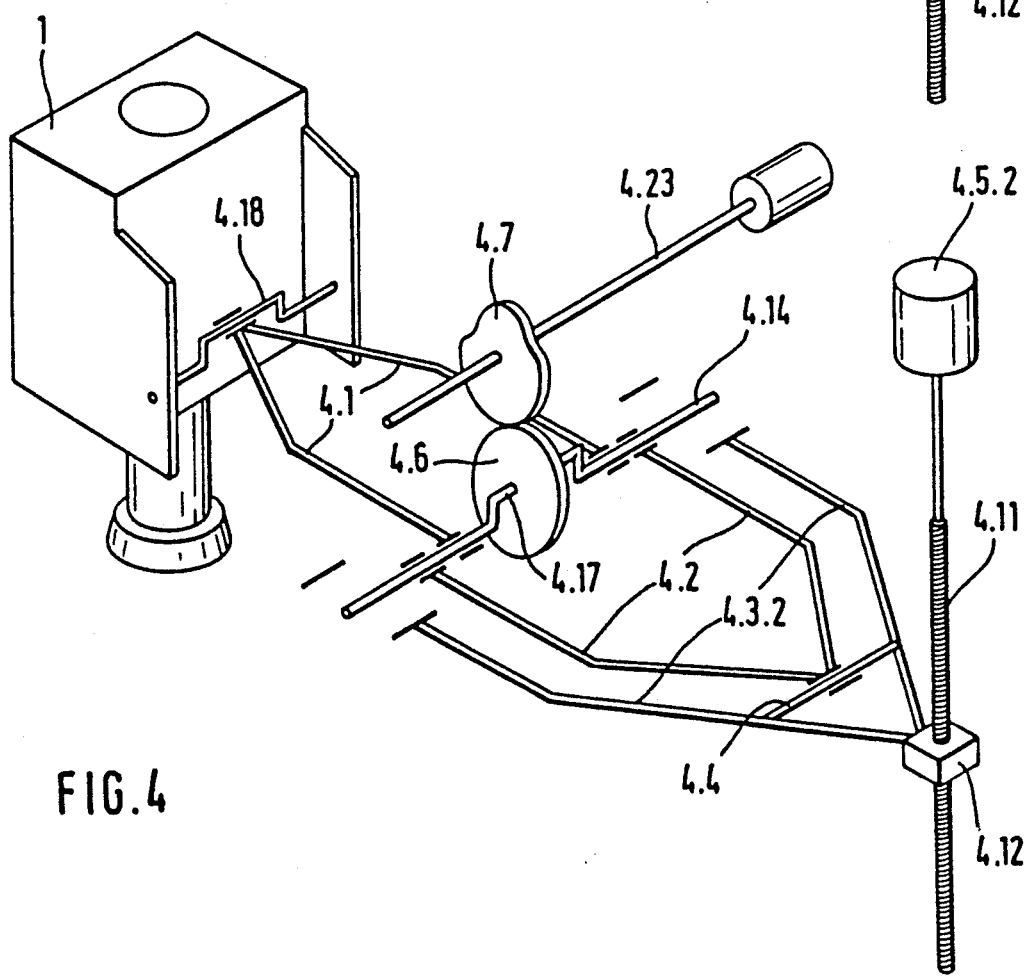
FIG. 4 shows parts of a second form of embodiment in a diagrammatic three-dimensional illustration.

The mode of operation of the second variant of the device for controlling the tool positioning is as follows in connection with FIG. 4. As in the first variant, so also in the second variant the establishment of a preselected basic lifting extent and of a lifting direction is effected by positioning of the toggle-mechanism pin 4.4 of the toggle mechanism, which is fixed to the mechanism, and its locking. The drive and the mode of operation of the cam 4.7 is also the same as in the first variant. In addition to the basic lifting extent in amount and direction as well as the course of the lifting extent along the length of the stroke, which is determined by the shape of the curve of the cam 4.7, this course can also be varied by the second form of common shaft 4.14, constructed in the shape of a crankshaft, in that this crankshaft is turned whereupon a displacement of the point of rotation of the lifting roller 4.6 on the crankshaft is effected. Such turning of the crankshaft can also be carried out while the machine tool is in operation and be regulated by the control of the other machine-tool functions. Moreover, with this variant, an additional modification of the course of the amount of lift along the length of stroke can be effected by means of a rotatable crank 4.18 which is disposed on the tool head 1 and which is adjustable manually or in a controlled manner depending on the other corresponding machine functions. According to the desired course of the machining line or lifting line, the means influencing this, namely the control curve of the cam 4.7, angle ψ of the position of the toggle lever 4.2, position of the crankshaft 4.14 and/or position of the crank 4.18 are adjusted.

Figure 5:
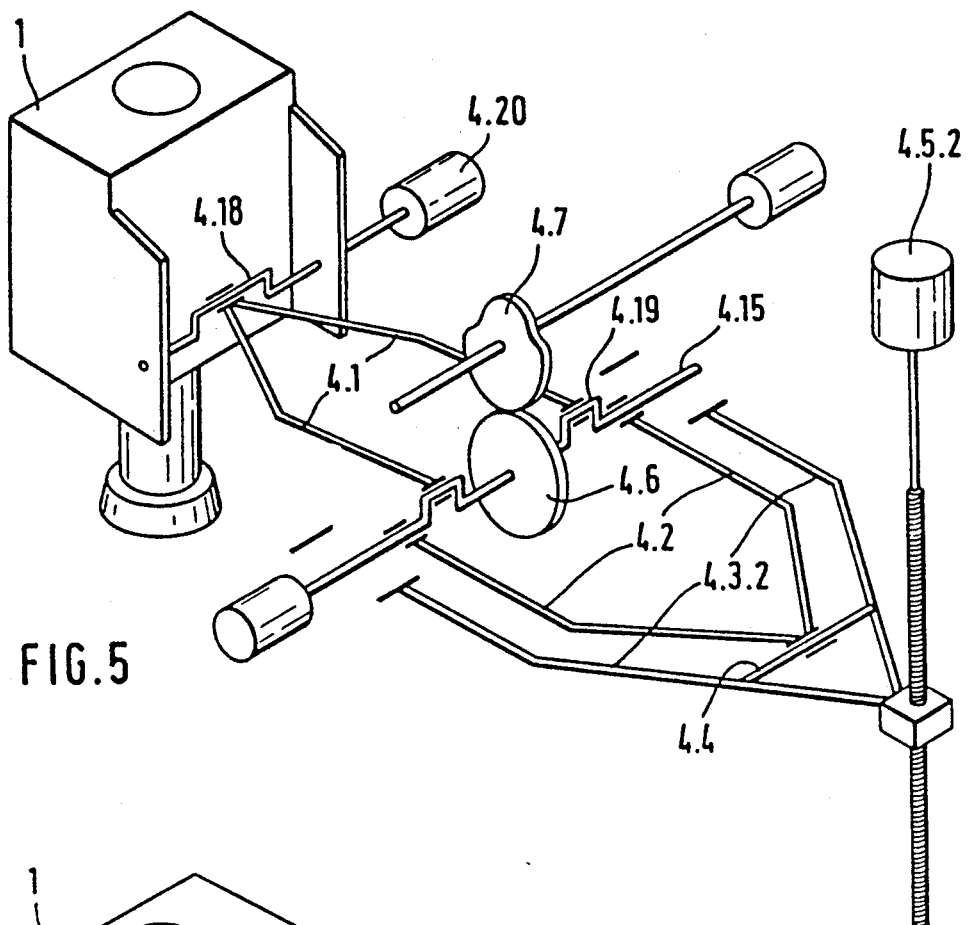
FIG. 5 shows parts of a third form of embodiment in a diagrammatic three-dimensional illustration.

A third variant of a tool positioning device 4 (FIG. 5) comprises a control mechanism which is constructed in the form of a toggle mechanism 4.1,4.2 and which contains a first toggle lever 4.1 which is articulated on the tool head 1 and on which there is articulated a second toggle lever 4.2 which in turn i connected to an adjustment device 4.3.2 comprising a control motor 4.5.2 and serving for the lockable displacement of the toggle-mechanism pin 4.4 for the selection of the lifting direction and/or the lifting extent.

In this case, the lifting extent is determined by the value of the angle of deflection ψ and the lifting direction is determined by the sign thereof. If the toggle-mechanism pin 4.4 fixed to the mechanism lies on the second toggle lever 4.2—with reference to FIG. 1 or 11 —below the horizontal plane of symmetry, this results in a first lifting direction and if this toggle-mechanism pin 4.4 lies on the second toggle lever 4.2 above the horizontal plane of symmetry, this results in a second lifting direction with the same cam 4.7.

A third form of common shaft 4.15 is constructed in the manner of a double crankshaft of the first form on which the first toggle lever 4.1 is articulated on the two crank-pins 4.19. Mounted on portions of the shaft beside the crankpin regions is the second toggle lever 4.2 and mounted on the shaft portion between the crankpin regions is the lifting roller 4.6 which cooperates with the cam 4.7 mounted on the camshaft 4.23, while a pressure-applying device 4.8 (not illustrated in FIG. 5) is provided as in the first variant of the tool positioning device 4 and holds the lifting roller 4.6 and the cam 4.7 in continuous contact with one another.

Instead of the crankshaft 4.15, eccentrics may also be provided for the mounting of the second toggle-lever arm 4.2 on the common shaft 4.15. These may also be adapted for adjustment in a controlled motor-driven manner.

The control curve of the cam 4.7 can be given a different effective shape by means of the eccentricity of the crank or eccentric. Acting in the same manner, an adjustable crank 4.18 is disposed on the tool head 1 with the first toggle lever 4.1 articulated to its crankpin. This crankpin may also be constructed in the form of an eccentric and either crankpin or eccentric may be connected to an adjustment device 4.20 on the tool head 1, and this may also be a controllable adjustment device for the automatic adjustment of the crankpin. The course of the flank line can also be influenced as a result, as by the eccentrics of the double crankshaft 4.15 and additionally to these, with automatic or controlled adjustment during the machining operation, without having to stop the machine or carry out dismantling and assembly work.

The mode of operation of the third variant of the device according to the invention (FIG. 5) again corresponds substantially to the first variant but in a modification of this, the two toggle levers 4.1 and 4.2 act on a double crankshaft 4.15 of the first form which can be turned manually or in a controlled and motor-driven manner, as a result of which, as in the second variant of the device according to the invention, a movement superimposed on the movement originating from the control curve of the cam 4.7 is effected and hence one with respect to the basic setting given by the values for the basic lifting amount (angle ψ). For a further modification of the machining line or the lifting line, the adjustable crank 4.18 disposed on the tool head 1 can be turned in a controlled and motor-driven manner, in tune with the control curve of the cam 4.7, the adjustment of the double crankshaft 4.15 of the first form and the set values for the basic lifting amount.

Figure 6:
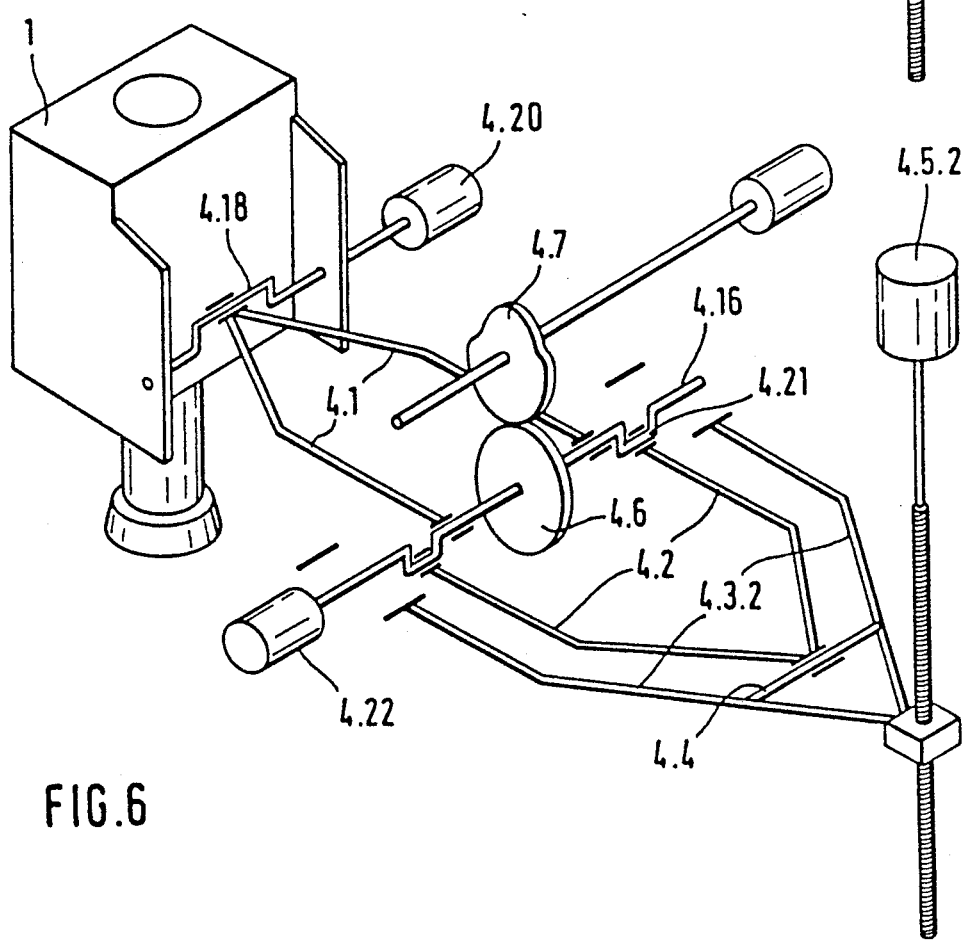
FIG. 6 shows parts of a fourth form of embodiment in a diagrammatic three-dimensional illustration.

A fourth variant of a tool positioning device 4, (FIG. 6) comprises a control mechanism which is constructed in the form of a toggle mechanism 4.1,4.2 and which contains a first toggle lever 4.1 which is articulated on the tool head 1 and on which there is articulated a second toggle lever 4.2 which in turn is connected to an adjustment device 4.3.2 comprising a control motor 4.5.2 and serving for the lockable displacement of the toggle-mechanism pin 4.4 for the selection of the lifting direction and/or the lifting extent.

In this case, the lifting extent is determined by the value of the angle of deflection ψ and the lifting direction by the sign thereof. If the toggle mechanism pin 4.4 fixed to the mechanism lies on the second toggle lever 4.2—with reference to FIG. 1 or 11—below the horizontal plane of symmetry, this results in a first lifting direction and if this toggle-mechanism pin 4.4 lies on the second toggle lever 4.2 above the horizontal plane of symmetry this results in a second lifting direction with the same cam 4.7.

A fourth form of common shaft 4.16 is constructed in the manner of a double crankshaft of the second form which is mounted with its normal shaft region in the first toggle lever 4.1 and carries the lifting roller 4.6 and on its crankpins 4.21 the second toggle lever 4.2 is articulated. Instead of these crankpins 4.21, eccentrics may also be provided which, like the crankpins, are connected to a motor-driven and controllable or manual adjustment device 4.22 which renders possible an automatic or manual adjustment of the eccentricity position and/or the extent of eccentricity (as in the other variants), in order to vary the course of the flank line of the workpiece without dismounting the cam 4.7. An adjustable crank 4.18, on the crankpin of which the first toggle lever 4.1 is articulated, is provided on the tool head 1 likewise in order to vary the course of the flank line of the workpiece during the machining operation. The course of the flank line of the workpiece and the return travel can also be influenced by an adjustment of this crank 4.18.

The cams 4.7 used in the said variants may either have a circular control curve or any non-circular control curve or a control curve composed of a control curve for lifting the tool and a control curve superimposed on this for producing a course of the machining line which can be determined.

It is also possible, however, for the cam 4.7 with the curve for controlling the lifting of the tool to be mounted on at least one adjustable cam eccentric (not illustrated) for determining the machining lines or the courses of the flank line and the return stroke separately from the curve for controlling the lifting of the tool. This cam eccentric may be connected to a control drive device (not illustrated) for guiding the tool along a machining line which can be preset.

The mode of operation of the fourth variant of the device according to the invention (FIG. 6) corresponds substantially to the mode of operation of the third variant (FIG. 5), the adjustment which is effective additionally to the cam 4.7 and the adjustable crank 4.18 being obtained by pivoting the double crankshaft of the second form 4.16 which displaces the pin of the toggle lever 4.2 at the lifting roller end instead of that of the toggle lever 4.1.

In a fifth variant of a tool positioning device 4 (FIG. 7), two cams 4.7A and 4.7B are disposed on a camshaft 4.23 which is connected to a controllable drive device 4.26. The lifting roller 4.6, which is mounted on the common shaft 4.13 opposite these cams 4.7A and 4.7B, is displaceably but lockably mounted so that it is in engagement either with the one cam 4.7A or with the other cam 4.7B. For this displacement, a first form of displacement device 4.24 is provided which is connected to a controlled motorised drive (not illustrated). The two cams have different control curves so that two substantially different flank lines can be produced which, with the adjustment possibilities known from the other variants of a tool positioning device 4, in so far as these are combined together or partially together in one form of embodiment, render possible a large and relatively finely graded number of modifications of the flank lines. The arrangement of the other components, such as the toggle levers 4.1,4.2, the pressure-applying device 4.8 etc. corresponds to the first variant (FIGS. 1, 2, 3, 11) in the variant shown in FIG. 7, with the inclusion of an adjustable crank 4.18 on the tool head 1.

The mode of operation of the fifth variant of the device according to the invention (FIG. 7) corresponds substantially to the mode of operation of the first variant (FIGS. 1, 2, 3, 11), while in order to avoid dismounting and assembly work, at least two cams 4.7 are disposed on the camshaft 4.23. By means of an axial displacement of the lifting roller 4.6, this is brought into contact with one of the cams 4.7 so that this combination can cooperate. As an addition to the first variant of the device according to the invention, adjustable crank 4.18 is provided on the tool head 1 as in the second, third or fourth variant and acts in the same manner as in the said variants, namely for the additional modification of the machining or lifting line superimposed on the cams 4.7 and the setting of the basic amount of lift.

Figure 7:
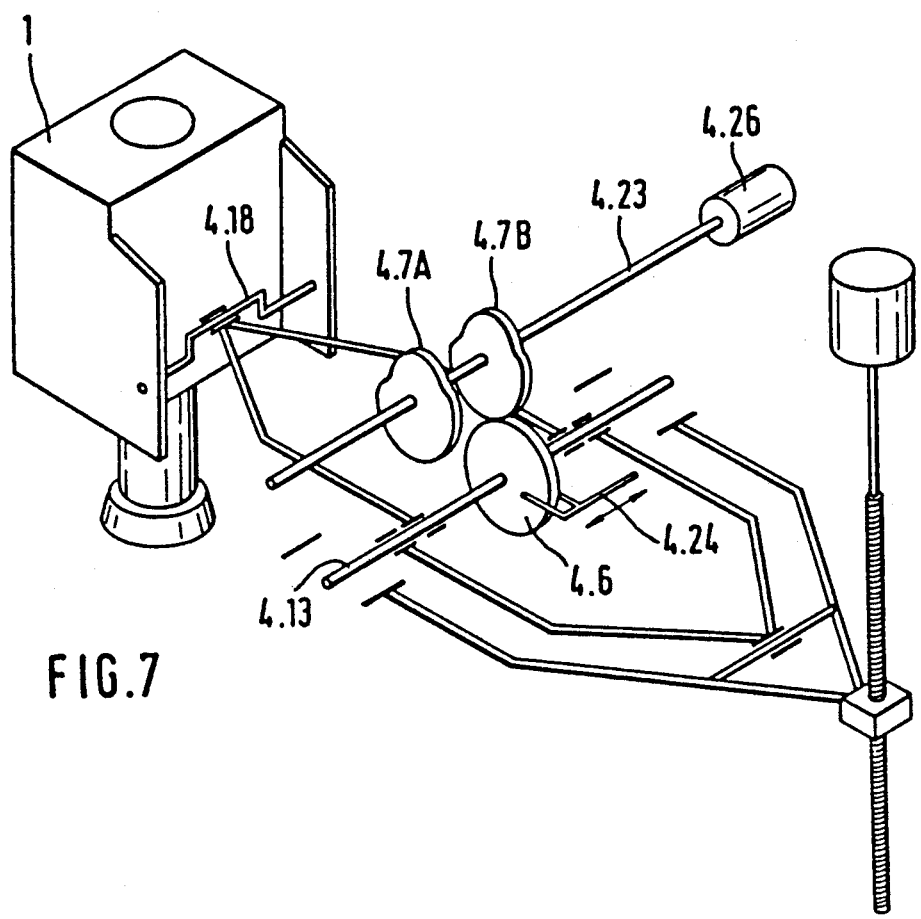
FIG. 7 shows parts of a fifth form of embodiment in a diagrammatic three-dimensional illustration with separate lifting and correction cams and a normal lifting roller.
Figure 8:
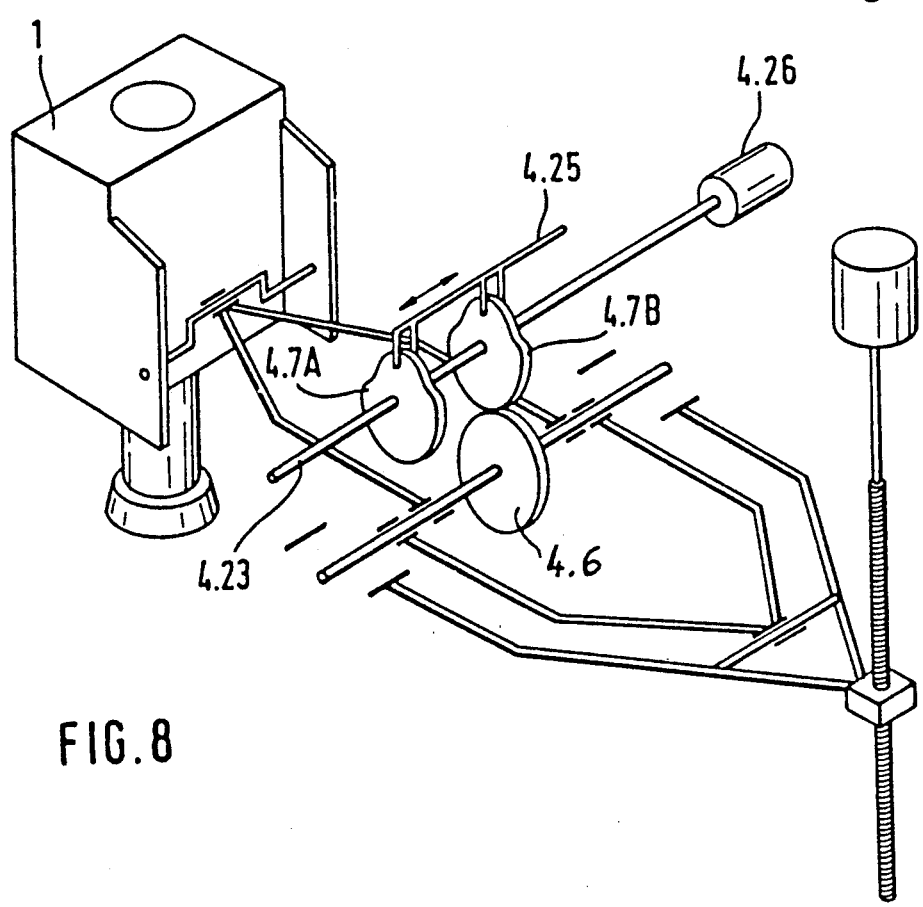
FIG. 8 shows parts of a sixth form of embodiment in a diagrammatic three-dimensional illustration with separate lifting and correction cams and a normal lifting roller.

In a sixth variant (FIG. 8) of a tool positioning device 4, in a modification of the form of embodiment shown in FIG. 7, the lifting roller 4.6 is mounted on the common pin 4.13 for free rotation but non-displaceably. Two cams 4.7A,4.7B are mounted on a camshaft 4.23 being held against torque but displaceable and can be rotated by a drive device 4.26 connected to the camshaft 4.23. A displacement device 4.25 of a second form is driven manually or by a motor (not illustrated) adapted for the axial displacement of the two cams 4.7A,4.7B with which these can be brought into operational connection with the lifting roller 4.6. The other components of the tool positioning device 4 are again arranged in accordance with the variant shown in FIG. 7.

The mode of operation of the sixth variant of the device according to the invention (FIG. 8) corresponds to the mode of operation of the fifth variant (FIG. 7) with the difference that it is not the lifting roller 4.6 but the cams 4.7 or the camshaft 4.23 which is axially displaceable in order to allow the different cams 4.7 to cooperate with the lifting roller 4.6 if the course of the machining line and/or the lifting line is to be altered. In this case, this axial displacement can be effected by means of the drive device 4.26 depending on the control of the other functions of the machine tool.

Figure 9:
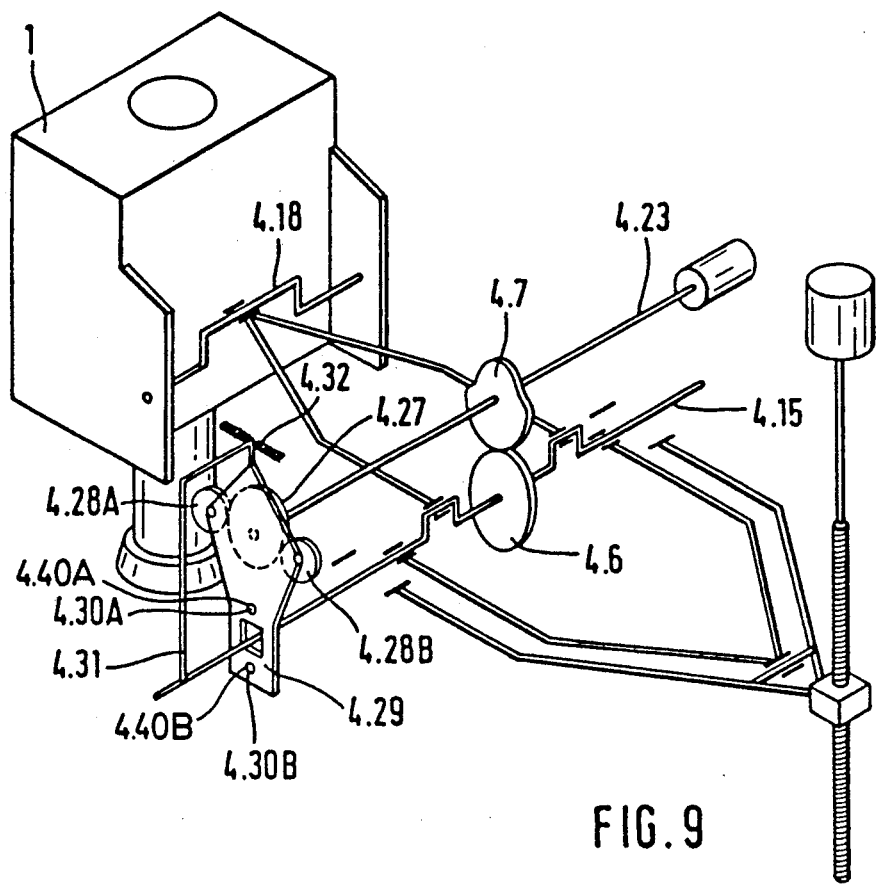
FIG. 9 shows parts of a seventh form of embodiment in a diagrammatical three-dimensional illustration with separate lifting and correction cams for the controllable superimposition of lift and correction.

In a seventh variant (FIG. 9) of the tool positioning device 4, the basic construction is selected in accordance with the third variant (FIG. 5) while as an adjusting device 4.22 for the crankshaft 4.15 or 4.16, a subcam 4.27 is mounted on the camshaft 4.23 and cooperates with two sensing rollers 4.28A and 4.28B respectively which are mounted in a transmission rocker 4.29 essentially comprising a two-part rocker body, one part of which has two pivots 4.30A and 4.30B to be used selectively. Of these pivots, the one is at a shorter distance from the camshaft 4.23 than the other, in order to make the transmission ratio variable between the subcam 4.27 and the pivotal movement of the common crankshaft 4.15 or 4.16 of the two toggle levers 4.1 and 4.2 respectively. Connected to the one part of the transmission rocker 4.29 is the second part which is constructed in the form of a transmission lever 4.31 and which is connected to the common shaft 4.15 or 4.16 for swivelling therewith in order to transmit the movement of the transmission rocker 4.29, corresponding to the shape of the curve of the subcam 4.27, to the common crankshaft 4.15 or 4.16 and so to displace the effective pivotal axes of the two toggle levers 4.1 and 4.2 in relation to one another. Thus the tool head 1 can be adjusted as stated for the other variants and so the course of the flank line and also the course of the return stroke can be altered in cooperation with the other adjusting devices. With appropriately controlled motorised drive, this can be done during the working strokes or return strokes while an alteration can also be set from stroke to stroke. The one sensing roller serves for the production of an inside profile and the other sensing roller for the production of an outside profile. In order that one of the two sensing rollers 4.28A or 4.28B may bear against the subcam 4.27 each time, a spring-loaded setting device 4.32 is provided and is in operational connection with the transmission rocker 4.29.

This adjusting device 4.22 illustrated here may, however, also be combined with one of the variants 2–4. Also, the movement derived from the subcam 4.27 can be transmitted directly to the adjustable crank 4.18 instead of to the common crankshaft via the transmission lever 4.31.

The mode of operation of the seventh variant of the device according to the invention (FIG. 9) corresponds to that of the third variant (FIG. 5), a special adjusting device 4.22 for the crankshaft 4.15 being provided. This adjusting device 4.22 transmits a pivotal movement from the camshaft 4.23 via a subcam 4.27 in accordance with its control curve to the crankshaft 4.15 and this movement can be varied in direction and extent respectively on the one hand by the selective contact of one of the sensing rollers 4.28A or 4.28B and/or by the selection of different pivots 4.30A or 4.30B of the transmission rocker 4.29. At least two of the pivots 4.30A and 4.30B have bearings 4.40A, 4.40B which are adjustable in position. At the same time, the elastic spring setting device 4.32 ensures a snug bearing of the particular sensing roller 4.28A or 4.28B against the subcam 4.27.

Figure 10:
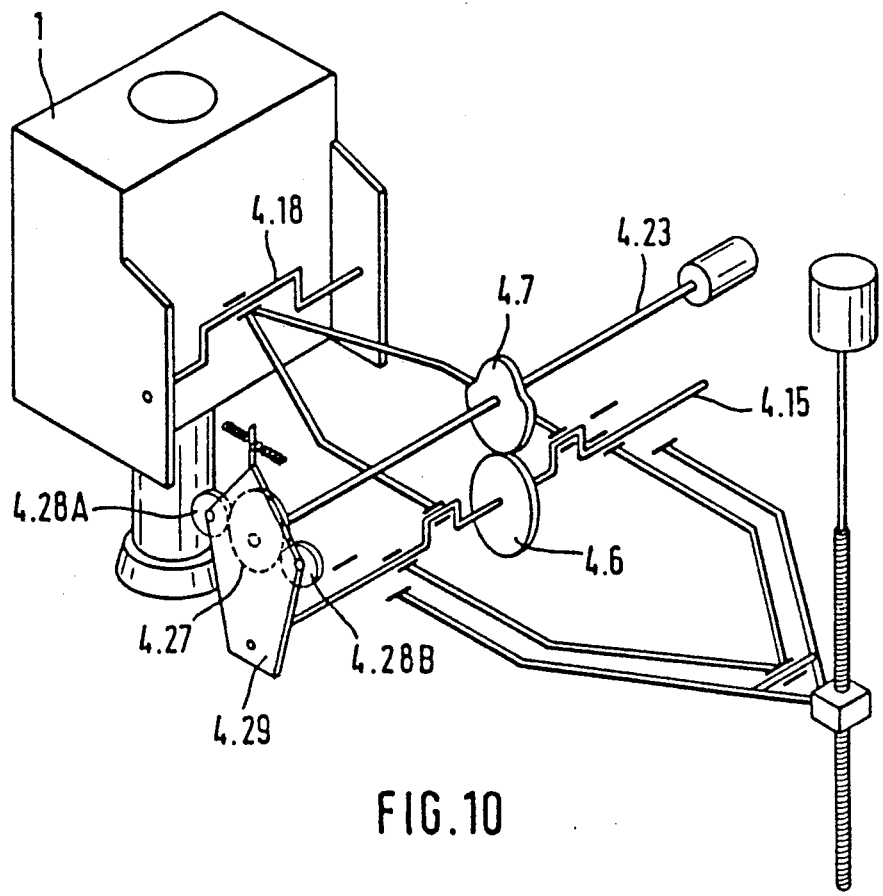
FIG. 10 shows parts of an eighth form of embodiment in a diagrammatic three-dimensional illustration with separate lifting and correction cams for the controllable superimposition of lift and correction.

In an eighth variant (FIG. 10) of a tool positioning device 4, the basic construction in accordance with the third variant (FIG. 5) is selected while a subcam 4.27 is mounted on the camshaft 4.23 as an adjusting device 4.22 for the crankshaft 4.15 or 4.16 and cooperates with two sensing rollers 4.28A and 4.28B respectively which are mounted in a transmission rocker 4.29 having a substantially one-piece rocker body. This is connected to the common crankshaft 4.15 or 4.16 for swivelling therewith and transmits the movement corresponding to the control curve of the subcam 4.27 to the crankshaft 4.15 or 4.16. As a result, the pivots of the two toggle levers 4.1 and 4.2 are displaced in relation to one another whereby an alteration is effected in the machining line or in the return-stroke line and hence in the flank line. The transmission rocker 4.29 is operationally connected to a spring-loaded setting device 4.32 which causes either the one sensing roller 4.28A or the other sensing roller 4.28B to come into contact. According to which of the sensing rollers in contact, the superimposed control is effected for an inside or outside profile on the workpiece.

In particular, it may be an advantage to combine the various subassemblies from the different forms of embodiment appropriately with one another.

The mode of operation of the eighth variant of the device according to the invention (FIG. 10) corresponds substantially to that of the seventh variant (FIG. 9) except that, in accordance with the simpler construction of the adjusting device 4.22, although the direction of the pivotal or swivelling movement of the double crankshaft of the first form 4.15 can be varied by it, the extent thereof cannot since the pivot of the transmission rocker 4.29 coincides with the doubl crankshaft. The direction of the pivoting is controlled by the selection of one of the sensing rollers 4.28A or 4.28B with the same subcam 4.27 and the extent of the pivoting is determined by the control curve of the subcam 4.27.

REFERENCE

1 Tool head
2 tool
3 tool spindle
4 tool positioning device/toggle mechanism
4.1 first toggle lever
4.2 second toggle lever
4.3 adjustment device
4.3.1 adjustment device, 1st variant
4.3.2 adjustment device, 2nd variant
4.4 lockable, displaceable toggle-mechanism pin fixed to the mechanism
4.5
4.5.1 control motor, 1st variant
4.5.2 control motor, 2nd variant
4.6 lifting roller
4.7 A,B cams
4.8 pressure-applying device
4.9 ram
4.10 drive device
4.11 screw spindle
4.12 nut of the screw spindle
4.13 common shaft of the 1st form as a straight shaft
4.14 common shaft of the 2nd form as a crankshaft
4.15 common shaft of the 3rd form as a double crankshaft of the 1st kind
4.16 common shaft of the 4th form as a double crankshaft of the 2nd kind
4.17 crankpin of the crankshaft 4.14
4.18 adjustable crank on the tool head/control crankpin
4.19 crankpin of the crankshaft 4.15
4.20 adjusting device on the tool head for crankpin
4.21 crankpin of the crankshaft 4.16
4.22 adjusting device for the crankshafts 4.15, 4.16
4.23 camshaft
4.24 displacement device, 1st kind
4.25 displacement device, 2nd kind
4.26 drive device for the camshaft
4.27 subcam
4.28A,B sensing rollers
4.29 transmission rocker
4.30A,B pivots of the transmission rocker
4.31 transmission lever of the two-part transmission rocker
4.32 spring-loaded setting device

I claim:

1. A device for controlling the tool position including the extent of lift of the tool relative to a work table and also at least one of a lifting direction of the tool relative to a work table and a course of the machining line of the tool along the length of the stroke of the tool, depending on the stroke position on machine tools with a reciprocating tool movement, such as shaping or slotting machines or planers, wherein a workpiece is received by a work table and a tool (2) is received by a tool head (1) and one of the work table and the tool head is connected to a tool positioning device for controlling the relative position between tool (2) and workpiece in the sense of a tool positioning relative to the stroke position, characterised in that the tool positioning device (4) comprises a control mechanism, connected to at least one drive device, to adjust the extent of lift and also at least one of the lifting direction, and the course of the machining line.

2. A device according to claim 1, characterised in that the control mechanism is a toggle mechanism (4.1,4.2) which is operatively connected to a control device for transmitting the control movement.

3. A device according to claim 2, characterised in that the toggle mechanism comprises an adjustment device (4.3) and a toggle mechanism pin (4.4) which can be displaced by said adjustment device (4.3) to fix the lifting direction or the extent of lift.

4. A device according to claim 3, characterised in that, in the toggle mechanism, lever arms (4.1,4.2) are articulated on a common toggle-lever pivot (4.13,4.14).

5. A device according to claim 3, characterised in that, in the toggle mechanism, the two lever arms (4.1,4.2) are articulated on a commom toggle-lever pivot (4.15,4.16), the articulations of the two lever arms being offset eccentrically in relation to one another.

6. A device according to claim 4 or 5, characterised in that a lifting roller (4.6) is disposed coaxially or eccentrically on the common toggle-lever pivot (4.13,4.14,4.15,4.16).

7. A device according to claim 5, characterised in that the eccentricity of the eccentrically offset articulations can be varied in a controllable or adjustable manner.

8. A device according to claim 3, characterised in that the adjustment device (4.3) is a crankshaft (4.3.1) which is mounted in the machine and has a crank pin on which there is located a reference point (4.4) of the toggle mechanism, and which is connected to a cotnrol motor (4.5.1) and an adjustment device.

9. A device according to claim 8, characterised in that the adjustment device (4.3) has an adjustment range with two regions situated symmetrically with respect to a neutral position, and defining a positive infeed movement which corresponds to one of said two regions and a negative infeed movement which corresponds to the other of said two regions and wherein the extent of each said infeed movement corresponds to the extent of the corresponding region.

10. A device according to claim 2, characterised in that the control device comprises, at least one control cam (4.7) which can be driven and has a tool control curve and which cooperates with a lifting roller (4.6), and a pressure-applying device (4.8) for causing continuous contact between the cam and the lifting roller.

11. A device according to claim 10, characterised in that the lifting roller (4.6) is mounted concentrically.

12. A device according to claim 10, characterised in that the lifting roller (4.6) is mounted eccentrically.

13. A device according to claim 10, characterised in that the lifting roller (4.6) is mounted eccentrically on a lifting-roller eccentric.

14. A device according to claim 10, characterised in that the lifting roller (4.6) is mounted eccentrically on a crankshaft (4.14).

15. A device according to claim 13, characterised in that the lifting-roller eccentric is an adjustable lifting-roller eccentric.

16. A device according to claim 15 characterised in that the adjustable lifting-roller eccentric can be driven in an adjustable or controllable manner.

17. A device according to claim 10, characterised in that apart from a control curve for lifting the tool, the cam (4.7) also has a control curve superimposed on this to produce a determinable course of the machining line.

18. A device according to claim 10, characterised in that the cam (4.7) having a tool-lifting control curve is mounted on at least one adjustable cam eccentric for setting the course of the machining line separately from the tool-lifting control curve.

19. A device according to claim 18, characterised in that the adjustable cam eccentric is connected to a control drive device for guiding the tool (2) along a machining line.

20. A device according to claim 18, characterised in that the cam (4.7) has a circular cam curve for lifting the tool.

21. A device according to claim 18, characterised in that the cam (4.7) has any non-circular cam curve for lifting the tool.

22. A device according to claim 10, characterised in that, with a plurality of cams (4.7), these and the lifting roller (4.6) are adjustable axially in relation to one another and can be brought into engagement alternately.

23. A device according to claim 22, characterised in that the cams (4.7) are displaceable driven by a motor and in a controllable manner.

24. A device according to claim 22, characterised in that the lifting roller (4.6) is displaceable driven by a motor and in an adjustable manner.

25. A device according to claim 10, characterised in that said control cam (4.7) and a subcam (4.27) are disposed on a common shaft (4.23), the subcam (4.27) also having a tool control curve and cooperating with a transmission rocker (4.29) operatively engageable with a crankshaft (4.15) coupled with said lifting roller 4.6 wherewith to transmit the control movement derived from the control curve of the subcam (4.27) to the tool positioning device.

26. A device according to claim 25, characterised in that the transmission rocker (4.29) is constructed with a substantially one-piece rocker body.

27. A device according to claim 25, characterised in that the transmission rocker (4.29) is constructed with a substantially two-part rocker body (4.29,4.31) of which one part carries at least one sensing roller (4.28A,4.28B), its two parts being able to be coupled to one another for the transmission of the control movement from the subcam (4.27) to the tool positioning device (4) and at least both parts have different pivots (4.30A,4.30B,4.15) so that the control movement derived from the cam (4.7) can be varied.

28. A device according to claim 27, characterized in that at least two of said pivots (4.30A, 4.30B) of the rocker member carrying the sensing rollers (4.28A, 4.28B) can be used alternatively.

29. A device according to claim 28, characterised in that the pivots (4.30A, 4.30B) have bearings which are adjustable in position.

30. A device according to claim 26 or 27, characterised in that the one sensing roller is provided lo take off the control movement for convex profiles and the other sensing roller is provided to take off the control movement for concave profiles.

31. A device according to claim 1 characterised in that in order to transmit the control movement from the device to the tool head (1), at least one control crankpin (4.18) is provided on the latter, on which crankpin the first toggle lever (4.1) acts.

32. A device according to claim 2, characterised in that the control device comprises an adjustable or controllable hydraulic-motor or electric-motor device.

33. A device according to claim 32, characterised in that the adjustable or controllable hydraulic-motor or electric-motor drive device is controllable in one of two manners, such that it operates either depending on stroke or independently of stroke.

34. A device according to claim 10, characterised in that the pressure-applying device (4.8) comprises a pressure-applying element with an elastic spring action, said pressure-applying element being of a type adapted to realize a soft spring action with the simultaneous transmission of great force.

35. A device according to claim 34, characterised in that the pressure-applying element is a hydraulic device.

36. A device according to claim 1, characterised in that the tool positioning device (4) acts on the tool head (1) and on a component of the machine frame and is operative depending on the infeed movement for the suppression of play in substantially the normal direction to the tool head (1).

* * * * *

UNITED STATES PATENT AND TRADEMARK OFFICE
CERTIFICATE OF CORRECTION

PATENT NO. : 5,018,913

DATED : May 28, 1991

INVENTOR(S) : Walter Seiberlich

It is certified that error appears in the above-identified patent and that said Letters Patent is hereby corrected as shown below:

Column 1, Line 56 "devicc which renders" it should be -- device which renders --

Column 5, Line 14 " which in turn i connected" it should be --which in turn is connected--.

Column 9, Line 8 "line and hence in the" it should be -- line and hence in the --

Column 9, Line 27 " with the doubl crankshaft" it should be -- with the double crankshaft --

Column 10, Line 39 " toggle mechanism, lever arms" it should be -- toggle mechanism, two lever arms --

Column 10, Line 58 "connected to a cotnrol " it should be -- connected to a control --

UNITED STATES PATENT AND TRADEMARK OFFICE
CERTIFICATE OF CORRECTION

PATENT NO. : 5,018,913

DATED : May 28, 1991

INVENTOR(S) : Walter Seiberlich

It is certified that error appears in the above-identified patent and that said Letters Patent is hereby corrected as shown below:

Column 12, line 25, "roller is provided lo take" it should be
--roller is provided to take--

Signed and Sealed this

Twenty-second Day of December, 1992

*Attest:*

DOUGLAS B. COMER

*Attesting Officer* — *Acting Commissioner of Patents and Trademarks*